United States Patent
Liu (10) Patent No.: US 11,059,225 B2
(45) Date of Patent: Jul. 13, 2021

(54) METHOD AND SYSTEM FOR APPLYING A FINISH TO THREE-DIMENSIONAL PRINTED OBJECTS

(71) Applicant: Xerox Corporation, Norwalk, CT (US)

(72) Inventor: Chu-Heng Liu, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 1248 days.

(21) Appl. No.: 15/157,966

(22) Filed: May 18, 2016

(65) Prior Publication Data

US 2017/0334135 A1 Nov. 23, 2017

(51) Int. Cl.
| | | |
|---|---|---|
| *B29C 64/209* | (2017.01) | |
| *B29C 64/112* | (2017.01) | |
| *B29C 64/10* | (2017.01) | |
| *B33Y 10/00* | (2015.01) | |
| *B33Y 30/00* | (2015.01) | |
| *B33Y 50/02* | (2015.01) | |
| *B29K 105/00* | (2006.01) | |

(52) U.S. Cl.
CPC ............ *B29C 64/209* (2017.08); *B29C 64/10* (2017.08); *B29C 64/112* (2017.08); *B29K 2105/0058* (2013.01); *B29K 2995/002* (2013.01); *B29K 2995/0026* (2013.01); *B33Y 10/00* (2014.12); *B33Y 30/00* (2014.12); *B33Y 50/02* (2014.12)

(58) Field of Classification Search
CPC ..... B29C 64/10; B29C 64/112; B29C 64/209; B33Y 10/00; B33Y 30/00; B33Y 50/02
See application file for complete search history.

(56) References Cited

U.S. PATENT DOCUMENTS

| | | | | |
|---|---|---|---|---|
| 6,572,807 B1 * | 6/2003 | Fong | ..................... | B33Y 10/00 264/237 |
| 6,782,303 B1 * | 8/2004 | Fong | .................. | G05B 19/4099 700/119 |
| 6,841,116 B2 * | 1/2005 | Schmidt | ................. | B33Y 30/00 264/401 |
| 6,936,212 B1 * | 8/2005 | Crawford | .................. | B28B 1/00 264/308 |
| 7,092,128 B2 | 8/2006 | Wang et al. | | |
| 8,509,933 B2 | 8/2013 | Steingart et al. | | |
| 8,876,513 B2 * | 11/2014 | Lim | .................... | B29C 67/0059 425/174.4 |
| 2004/0006405 A1 * | 1/2004 | Chen | .................. | G05B 19/4099 700/119 |

(Continued)

*Primary Examiner* — Joseph S Del Sole
*Assistant Examiner* — Manley L Cummins, IV
(74) *Attorney, Agent, or Firm* — Maginot Moore & Beck LLP (57) ABSTRACT

A three-dimensional object printer varies the finish in exposed surfaces of a printed object. The printer includes a controller operatively connected to at least two ejector heads, a leveling device, a curing device, and an actuator that is operatively connected to a member to which the at least two ejector heads, the leveling device, and the curing device are mounted. The controller is configured to detect a next layer to be formed being within a predetermined number of layers before an exposed surface is formed, to modify rendered data for the layers within the predetermined number of layers received from the source of rendered data, and to operate a plurality of ejectors in the at least two ejector heads with reference to the modified rendered data to apply a finish to the exposed surface.

9 Claims, 5 Drawing Sheets

(56) References Cited

U.S. PATENT DOCUMENTS

2007/0090568 A1* 4/2007 Teal .................. B33Y 30/00
264/308
2015/0079327 A1 3/2015 Kautz et al.

* cited by examiner

METHOD AND SYSTEM FOR APPLYING A FINISH TO THREE-DIMENSIONAL PRINTED OBJECTS

TECHNICAL FIELD

The device disclosed in this document relates to printers that produce three-dimensional objects and, more particularly, to the surface finishes of such objects.

BACKGROUND

Digital three-dimensional object manufacturing, also known as digital additive manufacturing, is a process of making a three-dimensional solid object from a digital model. Three-dimensional object printing is an additive process in which successive layers of material are formed on a substrate in different shapes. The layers can be formed by ejecting binder material, directed energy deposition, extruding material, ejecting material, fusing powder beds, laminating sheets, or exposing liquid photopolymer material to a curing radiation. The substrate on which the layers are formed is supported either on a platform that can be moved three dimensionally by operation of actuators operatively connected to the platform, or the material deposition devices are operatively connected to one or more actuators for controlled movement of the deposition devices to produce the layers that form the object. Three-dimensional object printing is distinguishable from traditional object-forming techniques, which mostly rely on the removal of material from a work piece by a subtractive process, such as cutting or drilling.

Usually during formation of a printed object, a layer of the object is at least partially cured and then leveled with a device that removes material from the layer. This leveling is typically performed with a device that moves across the layer in a horizontal direction while removing material that extends above a predetermined horizontal plane defined by the device. Leveling is performed every few layers to ensure a level foundation for future levels. If this leveling was not performed, small irregularities that produce uneven surfaces would continue to enlarge until the surface of the object is noticeably undulating.

The leveling of the surface, however, produces a homogenous finish everywhere on the object. This finish is relatively specular in nature. Some objects need to be formed with less reflective surfaces to prevent glare or to provide gripping surfaces on the object. Consequently, a three-dimensional object printer that can vary the surface finish on printed objects without producing noticeably undulating surfaces would be useful.

SUMMARY

A three-dimensional object printer that can vary the surface finish on three-dimensional printed objects includes a platen, at least two ejector heads, each ejector head having a plurality of ejectors fluidly connected to a supply of a material to enable the ejectors to eject material towards the platen, a leveling device, a curing device, at least one member to which the at least two ejector heads, the leveling device, and the curing device are mounted, an actuator operatively connected to the at least one member, a source of rendered data corresponding to layers of an object to be formed with the material ejected from the ejector heads, and a controller operatively connected to the at least two printheads, the leveling device, the curing device, the source of rendered data, and the actuator, the controller being configured to operate the actuator to move the at least one member to position the at least two printheads, the leveling device, and the curing device with reference to the platen, to operate the plurality of ejectors in each of the at least two printheads to form portions of layers of an object supported by the platen, to suspend operation of the leveling device in response to the controller detecting a next layer to be formed is within a predetermined number of layers before an exposed surface is formed, and to operate the plurality of ejectors in the at least two ejector heads with reference to the rendered data to form the predetermined number of layers without leveling.

A method for operating a three-dimensional printer that can vary the surface on three-dimensional printed objects includes operating an actuator with a controller to move at least one member to position at least two printheads, a leveling device, and a curing device with reference to a platen, operating with the controller a plurality of ejectors in each of the at least two printheads to form portions of layers of an object supported by the platen, suspending operation of the leveling device in response to the controller detecting a next layer to be formed being within a predetermined number of layers before an exposed surface is formed, and operating the plurality of ejectors in the at least two ejector heads with the controller using rendered data corresponding to the predetermined number of layers to form the predetermined number of layers without leveling.

BRIEF DESCRIPTION OF THE DRAWINGS

The foregoing aspects and other features of an apparatus and method that can vary the surface finish on three-dimensional printed objects are explained in the following description, taken in connection with the accompanying drawings.

DETAILED DESCRIPTION

For a general understanding of the environment for the device and method disclosed herein as well as the details for the apparatus and method, reference is made to the drawings. In the drawings, like reference numerals designate like elements.

Figure 1:
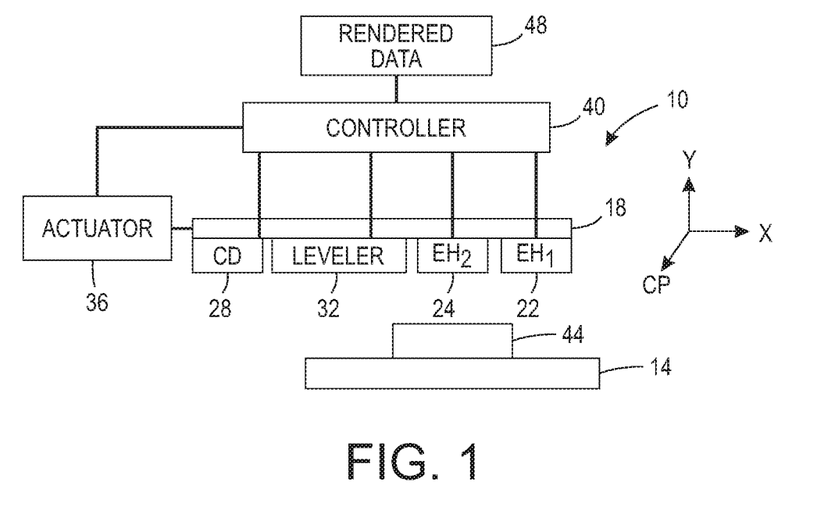
FIG. 1 depicts a printing system configured to vary the finish of three-dimensional printed objects.

FIG. 1 shows a three-dimensional object printer or additive manufacturing system 10 that ejects at least two different materials to form areas within layers of the object being formed. The printer 10 comprises a platen 14 on which the system forms an object or part 44. The printer also includes a pair of ejector heads 22, 24, a curing device 28, and a leveler 32, all of which are mounted to a member 18. The member 18 is operatively connected to one or more actuators 36. A controller 40 is operatively connected to the one or more actuators 36 to move the member 18 and the components mounted to the member in a process direction P in a plane that is parallel to the surface of platen 14. The controller 40 also operates the one or more actuators 36 to move the member 18 in vertical direction V to change the distance between the components and a top surface of the part 44 as the part 44 is built. Each ejector head 22 and 24 has a plurality of ejectors configured to eject drops of material towards the surface of the platen 14 to form areas within layers of a three-dimensional object, such as the part 44. Support areas within these layers can also be formed with other materials to enable part feature formation as known in the art. Although the system 10 is described as being configured to eject a first material through one ejector head and another material through another ejector head, an ejector head can be configured with multiple sets of ejectors, some of which eject one material and some of which eject another material. While the system 10 of FIG. 1 is shown as having a single member 18, the leveler 32, the curing device 28, and the ejectors heads 22 and 24 can be mounted to different members operatively connected to multiple actuators configured for control by the controller 40.

The controller 40 of the printer 10 is operatively connected to the at least two ejector heads 22, 24, the curing device 28, and the leveler 32. The controller 40 is configured to operate the ejector heads 22, 24 with reference to object image data that has been rendered into layers that form a three-dimensional object, such as part 44, on the platen 14. The rendered data 48 can be received from a remote data source, such as a CAD/CAM system, or from a memory in which such data is stored. To form each layer of the three-dimensional object, the controller 40 operates the printer 10 to sweep the ejector heads 22 and 24 one or more times in the process direction P, while ejecting drops of material onto the platen 14 or upon previously formed layers. After each layer is formed, the ejector heads move away from the platen 14 in the vertical direction V to a position appropriate for printing the next layer. The controller 40 can operate the one or more actuators 36 to position the leveler 32 to a predetermined plane and then operate the actuators 36 and the leveler 32 to remove material that extends above the predetermined plane. The controller 40 also operates the one or more actuators 36 to move the curing device 28 over the printed layer to cure the printed layer at least partially. After the top layer of the part 44 has been leveled and at least partially cured, the next layer can be formed on the part 44.

In previously known printing systems, the layer formation, leveling, and curing of the most recently printed layer continues until the part 44 is completed. In the system of FIG. 1, however, the controller 40 changes the operations performed as the last few layers of an exposed surface for the part 44 are formed to vary the finish of the exposed surface of the part. Specifically, the controller 40 in printer 10 terminates the leveling of a recently printed layer and may modify the object image data to enable the controller 44 to operate the ejector heads 22 and 24 in a manner that applies one or more predetermined finishes at the exposed surface of the part 44.

Figure 2:
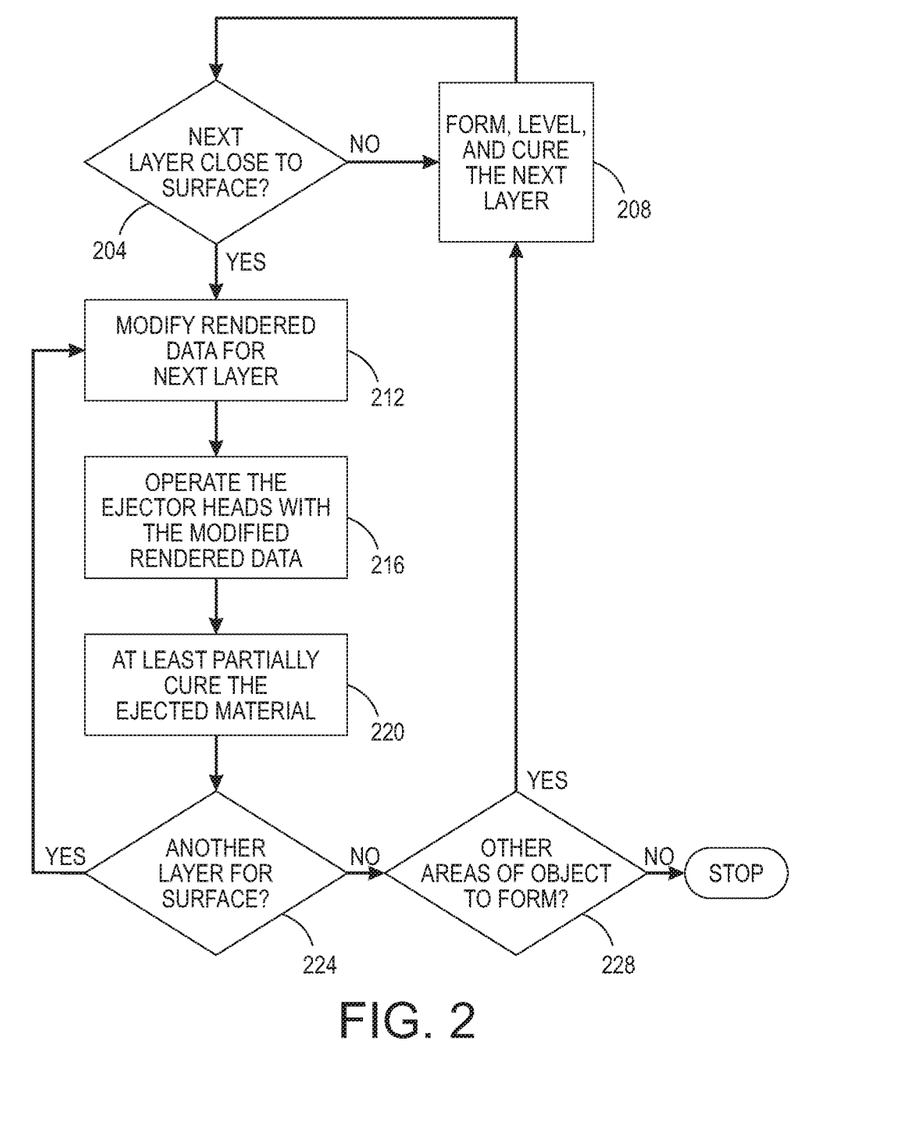
FIG. 2 depicts a method for operating the printing system of FIG. 1 to vary the finish of three-dimensional printed objects.

A process 200, shown in FIG. 2, is used to operate the system 10 to vary the finish of an exposed surface of an object. Statements that the process is performing some task or function refers to a controller or general purpose processor executing programmed instructions stored in non-transitory computer readable storage media operatively connected to the controller or processor to manipulate data and operate one or more components in the system to perform the task or function. The controller 40 of the printer 10 noted above can be configured with components and programmed instructions to provide a controller or processor that performs the process 200. Alternatively, the controller can be implemented with more than one processor and associated circuitry and components, each of which is configured to form one or more tasks or functions described herein.

The method 200 begins by detecting that a next layer to be formed is within a predetermined number of layers before an exposed surface of the object being formed (block 204). If the next layer is not within the predetermined number of layers, then the layer is formed, leveled, and cured, if necessary, as previous layers were (block 208). In the simplest version of the process 200, upon detection of a next layer being within a predetermined number of layers before an exposed surface, the process continues to operate the ejector heads to eject one or more materials for the next layer (block 216) and the layer is at least partially cured (block 220). The at least partially curing of the layer (block 220) is repeated for each of the layers within the predetermined number of layers, which includes the exposed layer, without leveling (block 224). The curing operation for the exposed layer is performed to cure completely the predetermined number of layers and a check is made to determine whether other areas of the object remain to be formed (block 228). If so, those layers are formed (block 208) until another surface area is approached (block 212 to 220). Otherwise, the process stops. By ceasing to perform the leveling operation and continuing to operate the ejectors and curing device to form the last few layers (blocks 216 and 220), the drops partially maintain semispherical shapes and lines of drops are formed as half-spheres. These microscopic surface textures reflect light more diffusely than the smooth surface remaining after a layer is leveled. The more diffuse the light reflection is, the less shiny is the surface.

The process 200 is improved by adding the processing of block 212 so the process can produce surface finishes with greater variability and predetermined characteristics. The process operates as described above until it reaches block 212. The processing of block 212 modifies rendered data in predetermined number of layers in at least a portion of the object being formed as described more fully below. The modified data is used to operate the ejector heads to eject one or more materials for the next layer (block 216) and the layer is at least partially cured (block 220). The modification of rendered data (block 212), the use of the modified data to eject the one or more materials (block 216), and the at least partially curing of the layer (block 220) is repeated for each of the layers within the predetermined number of layers, which includes the exposed layer, without leveling (block 224). The curing operation for the exposed layer is performed to cure completely the predetermined number of layers formed with the modified rendered data and a check is made to determine whether other areas of the object remain to be formed (block 228). If so, those layers are formed (block 208) until another surface area is approached (block 212 to 220). Otherwise, the process stops.

Figure 3:
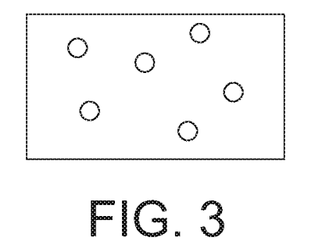
FIG. 3 illustrates a top view of a three-dimensional printed object having varied surface finishes.

The modification of the rendered data can be performed in a number of ways. In one embodiment, the rendered data is modified to align the ejected drops in a predetermined direction. For example, the rendered data can be modified to produce isolated drops in the layer that cause isotropic scattering of light that hits the layer as shown in FIG. 3. This type of rendered data modification includes halftoning of the rendered data. As used in this document, "halftoning" refers to applying a mask to the rendered data to eliminate some of the rendered data that would generate a drop of material if used to operate an ejector head. As the number of drops to be generated by the data increases from a sparse number of drops, the scattering of the reflected increases and is more diffuse. This diffusion of the light increases to a point at which the drops begin to converge with one another. When that phenomenon occurs, specular reflection increases so the finish becomes more glossy. The halftone structure that occurs from the sparse configuration up to the glossy configuration enhances the texture or roughness of the layers forming the exposed surface so the surface produces fewer specular reflections.

Figure 4:
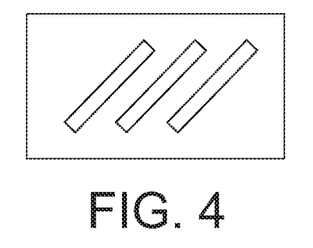
FIG. 4 illustrates a top view of a three-dimensional printed object having other varied surface finishes.

In another embodiment, the rendered data is modified to form half-spheres oriented in a predetermined direction as shown in FIG. 4. This structure produces directional gloss in the exposed surface finish. In some embodiments, the rendered data is also modified to correspond to clear material ejected by one of the ejector heads 22 or 24 or another ejector head included in the system 10. The clear material enables the finish not to interfere with the color of the previous layers formed in the object.

Figure 5:
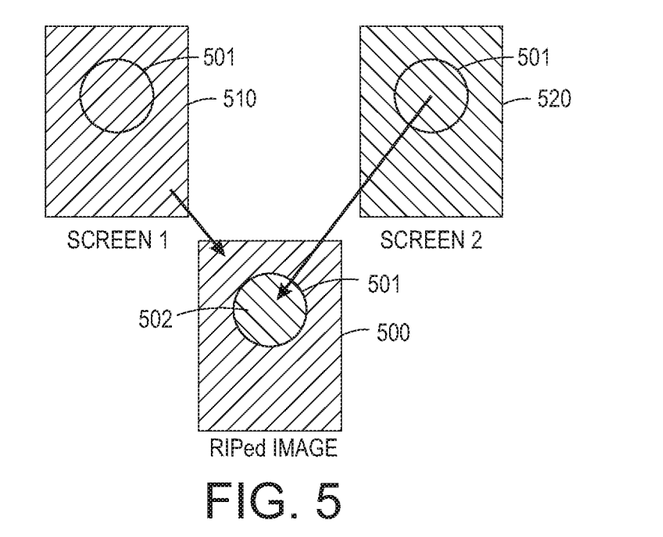
FIG. 5 is an illustration of two separate screens that can be combined as shown to produce a predetermined surface finish.

FIG. 5 depicts a predetermined surface finish 500 that can be produced by using the processes and systems described in this document. Screen 1 (reference number 510) and screen 2 (reference number 520) are separate screens having data that produces printed features that are at right angles to one another. The circle 501 is provided as a visual aid across the image screens 500, 510 and 520. The desired surface finish is for the area 502 in the midst of the RIPed image 500. Screen 1 (510) provides the field of right diagonal oriented anisotropic structure and screen 520 provides the spherical area of left diagonal oriented anisotropic structure. The field and spherical area are merged to produce the predetermined surface finish 500. As used in this document, "anisotropic" means structure that reflects light differently depending upon the angle from which either light strikes the structure or the structure is viewed.

Figure 6:
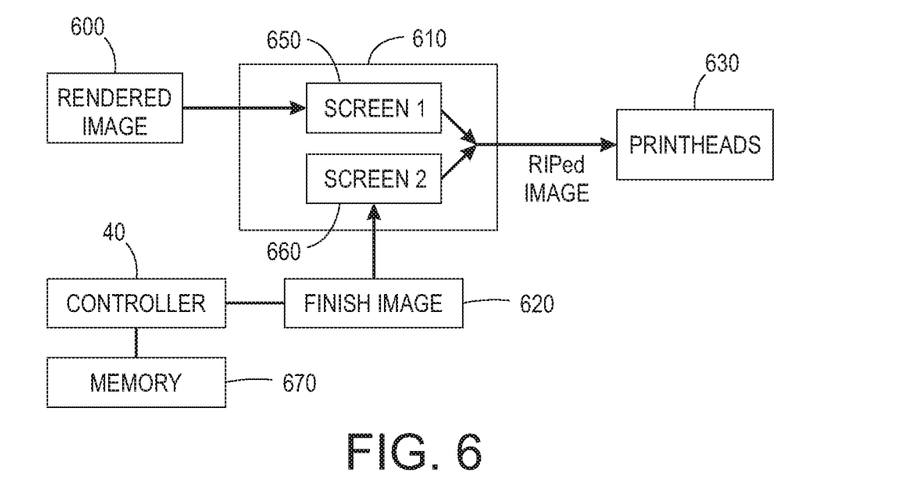
FIG. 6 is a block diagram of a system for generating and combining the two screens of FIG. 5 to produce data used to operate ejectors in printheads to produce the predetermined finish in a particular area of a printed object.
Figure 7:
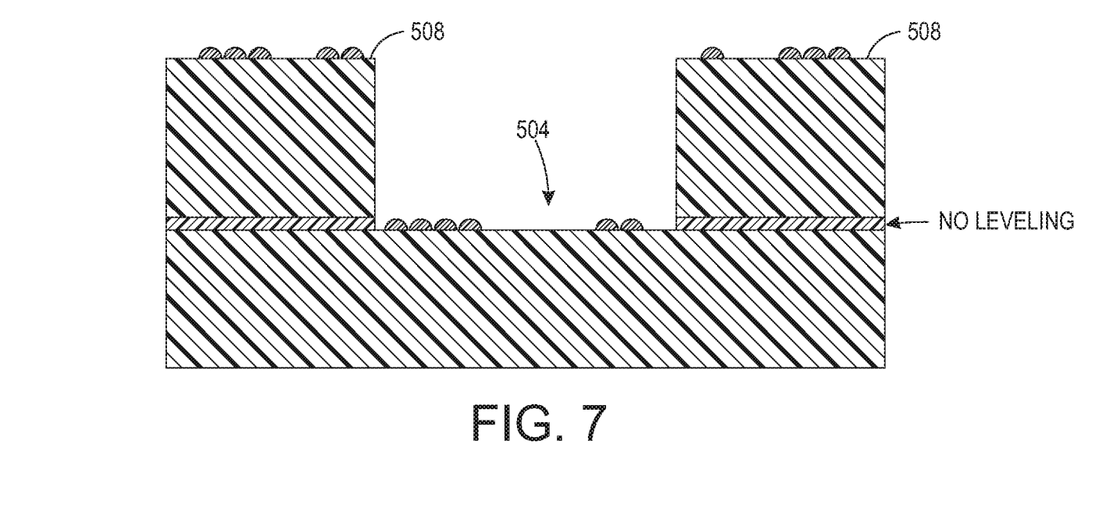
FIG. 7 is an illustration of a predetermined finish being formed in a recessed area of a printed object.

An embodiment that produces the predetermined surface finish 500 is shown in FIG. 6. The rendered image 600 is received as input data to screen 1 buffer 650 of the printhead driver 610. Image data corresponding to a predetermined finish is provided by controller 40 from those stored in memory 670 to screen 2 buffer 660 only when a finish area is to be produced. Provided no finish data is stored in the screen 2 buffer 660, the rendered data passes through the driver 610 without modification and is used to operate the ejectors in the printheads 630. When the controller 40 stops the leveling of partially cured layers within the predetermined number of layers near a surface, the controller also inputs finish data into finish image buffer 620, which stores the data in the screen 2 buffer 660 at appropriate locations. The finish image data in the screen 2 buffer 660 is used to overwrite portions of the rendered image data output from the screen 1 buffer 650 to modify the rendered image data used to drive the printheads 630. In this manner, a superimposition of a predetermined finish pattern is imbedded into the rendered image data to enable the printheads to print an area within the predetermined number of layers from a surface to provide a predetermined surface finish. The superimposed data can be anisotropic structure of one orientation type that is different than the orientation type of the anisotropic structure in the remaining rendered data. As used in this document, "orientation type" refers to an angle at which the anisotropic structure is formed. As shown in FIG. 7, the process 200 and the system of FIG. 6 can be used to produce a finish in a recessed area 504 as well as surface areas 508. The finishes in these different areas can be different.

It will be appreciated that variants of the above-disclosed and other features and functions, or alternatives thereof, may be desirably combined into many other different systems, applications or methods. Various presently unforeseen or unanticipated alternatives, modifications, variations, or improvements therein may be subsequently made by those skilled in the art, which are also intended to be encompassed by the following claims.

What is claimed is:

1. A printer comprising:
a platen;
at least two ejector heads, each ejector head having a plurality of ejectors fluidly connected to a supply of a material to enable the ejectors to eject material towards the platen;
a leveling device;
a curing device;
at least one member to which the at least two ejector heads, the leveling device, and the curing device are mounted;
an actuator operatively connected to the at least one member;
a source of rendered data corresponding to layers of an object to be formed with the material ejected from the ejector heads; and
a controller operatively connected to the at least two ejector heads, the leveling device, the curing device, the source of rendered data, and the actuator, the controller being configured to operate the actuator to move the at least one member to position the at least two ejector heads, the leveling device, and the curing device with reference to the platen, to operate the plurality of ejectors in each of the at least two ejector heads to form portions of layers of an object supported by the platen, to suspend operation of the leveling device in response to the controller detecting a next layer to be formed is within a predetermined number of layers before an exposed surface is formed, and to operate the plurality of ejectors in the at least two ejector heads with reference to the rendered data to form the predetermined number of layers without leveling.

2. The printer of claim 1, the controller being further configured to:
operate the curing device after the predetermined number of layers are formed to cure the predetermined number of layers.

3. The printer of claim 1, the controller being further configured to:
modify the rendered data for the layers within the predetermined number of layers received from the source of rendered data; and
use the modified rendered data to form the predetermined number of layers without leveling.

4. The printer of claim 1, the controller being further configured to:
modify the rendered data by halftoning the rendered data for the next layer to be formed.

5. The printer of claim 3, the controller being further configured to:
modify the rendered data to produce half-spheres of material in the next layer to be formed.

6. The printer of claim 5, the controller being further configured to:
  modify the rendered data to produce the half-spheres in the next layer to be formed with a predetermined direction.

7. The printer of claim 3, the controller being further configured to:
  modify the rendered data to operate ejectors within the at least two ejector heads to eject clear material.

8. The printer of claim 3, the controller being further configured to:
  modify the rendered data by overwriting a portion of the rendered data with finish image data to produce a predetermined finish within the predetermined number of layers.

9. The printer of claim 8, the controller being further configured to:
  overwrite the portion of the rendered data with finish image data corresponding to an anisotropic structure with an orientation type that is different than an orientation type of an anisotropic structure corresponding to the rendered data adjacent the overwritten rendered data.

* * * * *